Mar. 13, 1923.

M. TIBBETTS

HYDROCARBON MOTOR

Filed Oct. 23, 1919

Inventor,
Milton Tibbetts

Patented Mar. 13, 1923

1,448,641

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 23, 1919. Serial No. 332,706.

*To all whom it may concern:*

Be it known that I, MILTON TIBBETTS, a citizen of the United States, and resident of Detroit, Wayne County, State of Michigan, have invented certain new and useful Improvements in Hydrocarbon Motors, of which the following is a specification.

This invention relates to hydrocarbon motors and particularly to heater devices therefor.

In hydrocarbon motors, particularly as used on automobiles, heater devices have been designed for heating the mixture passing through the motor intake pipe. In one form of such heater a combustion chamber is arranged in heating relation to the motor intake pipe and is supplied with a combustible mixture from an auxiliary carburetor. There is an outlet from the combustion chamber to the intake pipe so that the suction of the motor draws the charge into the combustion chamber. A spark is created in the combustion chamber to fire the charge and the burnt gases pass into the intake header. The header is heated through its wall and the mixture therein is heated by contact with the hot burnt gases.

In devices such as the above no provision has heretofore been made for heating such parts of the motor carburetor as may be exposed to freezing. For instance, it is frequently found that water in the gasoline collects in the lower parts of the carburetor and freezes there when the motor is standing idle in cold weather. Under these circumstances no amount of heat applied to the intake pipe above the carburetor would thaw out the main carburetor some distance below it and if the water has collected and frozen in the float chamber inlet only a small amount of gasoline will be available for the combustion heater.

It is one of the objects of this invention, therefore, to provide auxiliary heating means for the motor carburetor which shall be supplied with a heating medium from a combustion heater device.

Another object of the invention is to provide an auxiliary heater for any desired purpose, which heater is supplied with a heating medium from a combustion heater device of the type above referred to.

Another object of the invention is to provide heating means for the lower part or fuel well of a motor carburetor, the heating medium for which may be supplied by a combustion heater device of the type above referred to.

Another object of the invention is to provide a combustion heater device with two outlet conduits either of which may be connected with the device and both of which discharge into the motor intake header.

Figure 1:
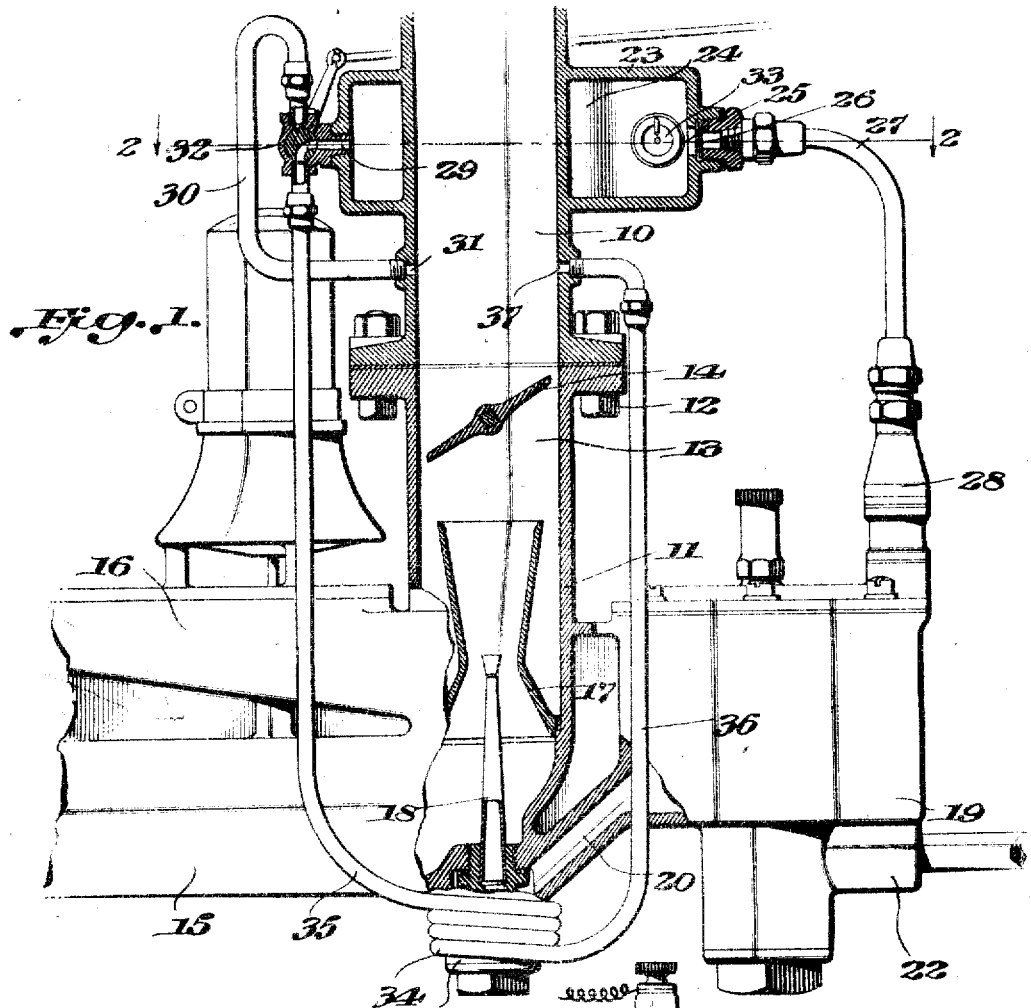
Figure 2:
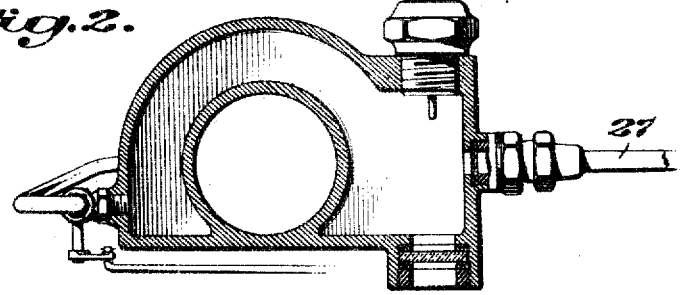

Other objects of the invention will appear from the following description taken in connection with the drawings which form a part of this specification and in which Figure 1 is a sectional view and part elevation of a motor carburetor and intake pipe embodying the invention; and Figure 2 is a section on the line 2—2 of Figure 1.

Referring to the drawings, 10 represents the intake pipe or header of a hydrocarbon motor and 11 is a carburetor connected thereto as by the bolts 12 and having its upper part in the form of a passage 13 which is a continuation of the interior of the motor intake pipe 10. In this intake conduit formed by the passage 13 and the interior of the intake pipe 10 is a throttle valve 14 which is usually manually operated to control the speed of the motor.

The carburetor 11 comprises in general a main air inlet 15, an auxiliary air inlet 16, a mixture tube 17, a gasoline nozzle 18, and a float chamber 19, the float chamber communicating with the gasoline nozzle 18 by a passage 20 and a well 21 which is directly beneath the lower end of the fuel nozzle 18. The float chamber 19 is supplied with liquid fuel, such as gasoline, by a pipe 22 and the float in the chamber 19 controls the supply in a well known manner.

In the form of carburetor shown, which is the well known Packard carburetor, the well 21 is one of the low points containing the liquid fuel and with some of the gasoline now in use it is frequently found that water will collect in this low part of the carburetor and in very cold weather it will freeze, thus completely stopping the passage of gasoline from the float chamber 19 to the fuel nozzle 18 and of course rendering the carburetor inoperative.

Arranged in heating relation to the intake pipe 10 is a combustion heater 23 which, in the present instance, comprises a chamber 24 surrounding a part of the intake header 10 and having an inlet port 25 covered by a screen 26 and connected by a pipe 27 with an auxiliary carburetor 28. The auxiliary carburetor 28, which may be of any suitable form that will supply a combustible mixture to the combustion chamber 24, is shown as mounted on the float chamber 19 and is, of course, connected with the gasoline therein.

The outlet from the combustion chamber 24 is through a port 29 and a bypass pipe 30 which discharges into the intake pipe 10 at 31, this point being above the throttle 14 so that the pipe 30 is subject to the suction of the motor. The valve 32 may be turned to connect the port 29 with the pipe 30 so that the suction of the motor will be communicated to the combustion chamber 24 and thereby draw a mixture from the auxiliary carburetor 28. A spark plug 33 is arranged in the chamber 24 for firing the charge thus drawn into the chamber and the heat from the burning of the mixture is transferred through the walls of the intake pipe 10 to the mixture therein passing to the motor. The burnt gases also pass through the pipe 30 into the intake pipe 10 and mix with the mixture and thereby further heat it. For the purpose of carrying heat to some other part of the motor or car, an auxiliary heater may be connected to the outlet of the combustion chamber 24 and arranged between said chamber and the motor intake pipe. One form of such auxiliary heater is shown herein and comprises a coil or heater 34 which, in the present instance, is shown as wrapped around the well 21 of the motor carburetor so that the heat from this coil may be conveyed directly to the casting forming the lower part of the carburetor. The heater 34 is supplied from a pipe 35 connected with the valve 32 and the outlet from the heater extends in the form of a pipe 36 to a point 37 where it empties into the intake pipe 10 above the throttle 14. By turning the switch valve 32 to the position shown in the drawing the port 29 may be placed in communication with the pipe 35 and the motor suction will then communicate with the combustion chamber 24 through the pipe 36, heater 34 and pipe 35 so that the products of combustion from the combustion chamber 24 will pass through the heater 34 before they reach the intake pipe 10.

From the above it will be seen that should there be a collection of water in the well 21 or in any other low part of the carburetor, which water has frozen and stopped the functioning of the carburetor, the valve 32 may be turned as shown and upon cranking the motor as by an electric starting motor, or otherwise, the combustion heater 23 will operate and hot burned gases will pass from the combustion chamber 24 through the heater 34 and thus thaw out the carburetor. Because of the location of the heater 34 at a low point of the carburetor the heater will tend to thaw out any part of the carburetor that may be frozen above that point.

It will be understood that other uses may be made of the auxiliary heater here shown and described, and various modifications may be made without departing from the spirit or scope of the invention.

Having thus described my invention, what I claim and desire to secure by Letters Patent is:

1. In a hydrocarbon motor, the combination with the carburetor and intake pipe thereof, and a throttle valve, of a combustion heater device arranged in direct heating relation with said intake pipe above the carburetor, and a heating conduit leading from said device to the lower part of the carburetor and having its outlet connected with said intake pipe above said throttle valve.

2. In a hydrocarbon motor, the combination with the carburetor and intake pipe thereof, and a throttle valve, of a combustion heater device arranged in heating relation to said intake pipe, and a conduit leading from said device to a portion of the carburetor containing the liquid fuel and having its outlet connected to the intake pipe above the throttle valve.

3. In a hydrocarbon motor, the combination with the intake pipe thereof, of a combustion heater arranged in heating relation to said pipe, two independent conduits leading from said combustion heater to said intake pipe, and a valve arranged to connect either of said conduits with said heater.

4. In a hydrocarbon motor, the combination with the intake pipe thereof, of a combustion heater device arranged in heating relation therewith, and a secondary heater connected with the outlet from said combustion heater device, said secondary heater discharging into the motor intake pipe.

5. In a hydrocarbon motor, the combination with the intake pipe thereof, of a combustion heater device arranged in heating relation therewith, a secondary heater connected with the outlet from said combustion heater device, said secondary heater discharging into the motor intake pipe, and a bypass from said heater device directly to said intake pipe.

6. In a hydrocarbon motor, the combination with the carburetor having a float chamber, and the motor intake pipe, of a combustion heater device, a heating conduit leading from said device to the lower part of said carburetor and having its outlet connected to said intake pipe, and means connected to said float chamber for supplying mixture to said heater device.

7. In a hydrocarbon motor, the combination with the motor intake pipe, of a carburetor connected to supply mixture thereto, a combustion heater for the mixture and having a part in heating relation to the lower part of said carburetor, and means separate from the main carburetor for supplying mixture to said heater.

In testimony whereof I affix my signature.

MILTON TIBBETTS.